United States Patent
Oshima et al.

[19]

[11] Patent Number: 6,158,553
[45] Date of Patent: Dec. 12, 2000

[54] CURTAILED OPERATION OF MULTIPLE-WOUND INDUCTION MOTOR FOLLOWING INVERTER FAILURE

[75] Inventors: Kenji Oshima, Yokohama; Tetsuo Yamada, Gifu; Takashi Kodama, Nishikasugai-gun; Yasuhiro Yoshida, Nagoya, all of Japan

[73] Assignee: Otis Elevator Company, Farmington, Conn.

[21] Appl. No.: 09/320,073

[22] Filed: May 26, 1999

[30] Foreign Application Priority Data

Jun. 16, 1998 [JP] Japan ................................. 10-168050

[51] Int. Cl.[7] .................................................... B66B 1/34
[52] U.S. Cl. .............................. 187/293; 363/41; 363/55; 363/71; 312/802
[58] Field of Search ..................................... 187/287, 277, 187/293–297; 361/23.31, 33, 87, 93, 100; 363/41, 40, 50, 55, 71, 95, 98; 307/53, 58, 60, 62, 64, 68, 82; 318/434, 599, 799–815

[56] References Cited

U.S. PATENT DOCUMENTS

| | | |
|---|---|---|
| 3,798,530 | 3/1974 | Henderson ................................. 321/11 |
| 4,063,302 | 12/1977 | Donig ........................................ 361/90 |
| 5,237,494 | 8/1993 | Baader et al. ........................... 363/141 |
| 5,460,244 | 10/1995 | Tanahashi ................................. 187/293 |
| 5,629,591 | 5/1997 | Thevenon .................................. 318/49 |
| 5,768,117 | 6/1998 | Takahashi et al. ....................... 363/65 |
| 5,959,858 | 9/1999 | Kanouda et al. ........................ 363/149 |
| 5,969,919 | 10/1999 | Kobayashi et al. ....................... 361/23 |
| 6,031,298 | 2/2000 | Lo et al. .................................... 307/64 |

*Primary Examiner*—Jonathan Salata

[57] ABSTRACT

A multiple-wound, three-phase, variable speed motor having N independent winding sets is driven by N inverters, each responding to 1/N of the torque and excitation current commands, and the torque current is limited as a function of N times the limiting current each inverter may tolerate, when all inverters are functioning. When M inverters fail, they are disconnected from the motor, the torque current is limited as function of N−M times the limiting current each inverter may tolerate. The remaining N−M inverters may each respond to 1/(N−M) of the torque and excitation commands. The excitation current may be maximized as (N−M) times the limiting current divided by the square root of two. The speed command may be predetermined by the integration over an acceleration interval, of the maximum acceleration achievable with torque available from those of the inverters which have not failed, in view of the inverters' current limits.

6 Claims, 11 Drawing Sheets

CURTAILED OPERATION OF MULTIPLE-WOUND INDUCTION MOTOR FOLLOWING INVERTER FAILURE

TECHNICAL FIELD

This invention relates to improving the curtailed operation of a multiple-wound induction motor which is driven by a corresponding plurality of pulse width modulated (PWM) inverters, following failure of one or more inverters.

BACKGROUND ART

It is known in the prior art to employ multiple-wound three-phase motors driven by a corresponding number of PWM inverters, each inverter corresponding to a winding set on the motor. It is also known to allow functioning inverters to operate the motor following failure of one or more of the inverters. In such a case, each inverter drives the winding set to which it corresponds, and the failed inverters are cut off from the system. It is possible to use a tandem motor configuration so that the functioning inverters can operate the motor without switching. However, tandem configurations are costly and require excessively long shaft length. For a double wound tandem configuration, the shaft is twice as long as a single wound motor.

It has been shown in Japanese Patent Application No. SHO 62 [1987]-64957 two separate inverters are coupled with a phase-to-phase reactor to drive a single motor; if one inverter unit fails, it is disconnected and the motor is operated at lower speed and torque with the functioning inverter. In Hokari et al, "Drive System of Ultra High Speed Elevator", 1994 National Conference of the Electric Association, No. 551, pp. 5-91 to 5-92, each of two independent windings on a double wound motor are driven independently with a corresponding inverter; when one inverter fails, it is disconnected, and the other winding set is driven with the functioning inverter. Japanese Kokoku patent No. HEI 7[1995]-002037 causes the current command to be reduced by one-half to operate a three-phase double wound motor following the failure of one inverter. When one functioning inverter is used to drive one winding set of a double wound motor, following failure of the other inverter, the excitation current command, $I_0^*$, and torque current command, $I_T^*$, within the motor become one-half of what they would be with both inverters driving the motor, so that motor torque is reduced to one-quarter of normal torque.

DISCLOSURE OF INVENTION

Objects of the invention include provision of a three-phase multiple wound motor with plural inverter units which will provide torque greater than the torque which the motor would produce as a normal response to the individual inverter units which remain functioning following failure of one or more other inverter units; and providing, during curtailed operation of a multiple-wound three-phase motor following a failure of one or more inverters, motor torque which is higher than that provided during curtailed operation following inverter failure in three-phase multiple-wound motor systems known to the prior art.

According to the present invention, a variable speed drive system includes a plurality of inverter units, each of which drives a corresponding one of a plurality of independent winding sets on a multiple-wound, three-phase motor, each winding set contributing a corresponding fraction of the motor currents during normal operation, and upon failure of one or more of the inverters, the torque current command limit is altered to accommodate the reduced current capacity of the functioning inverters. According to the invention, the operation of the functioning inverters is altered so that the torque produced by the motor is increased above that which would be produced by responding to the normal operation of the remaining inverters.

In accordance with one aspect of the present invention, whenever there is a failure of one or more inverters driving a multiple-wound three-phase motor, the excitation current and the torque current of the functioning inverters is changed from being 1/N to being 1/(N–M), where N is the total number of inverters and M is the number of failed inverters, so that the required current is supplied with fewer inverters. In accordance with another aspect of the present invention, when the one of a plurality of inverters driving a multiple-wound three-phase motor has failed, the excitation current command provided to the functioning inverters is a proportional fraction of the maximum current which each inverter may supply. In accordance with still another aspect of the present invention, failure of one out of a plurality of inverters driving a multiple-wound, three-phase motor interrupts the current feedback loop of the functioning inverters, so that the motor is overdriven in an open-ended fashion, relying only on the speed feedback loop. According to another aspect of the present invention, the torque current provided by functioning inverters to a multiple-wound, three-phase motor, after one more inverters have failed, is controlled by limiting the speed command to that which results in an acceleration achievable within the maximum torque capable of being provided by the functioning inverters, taking into account their current limits.

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 1A:
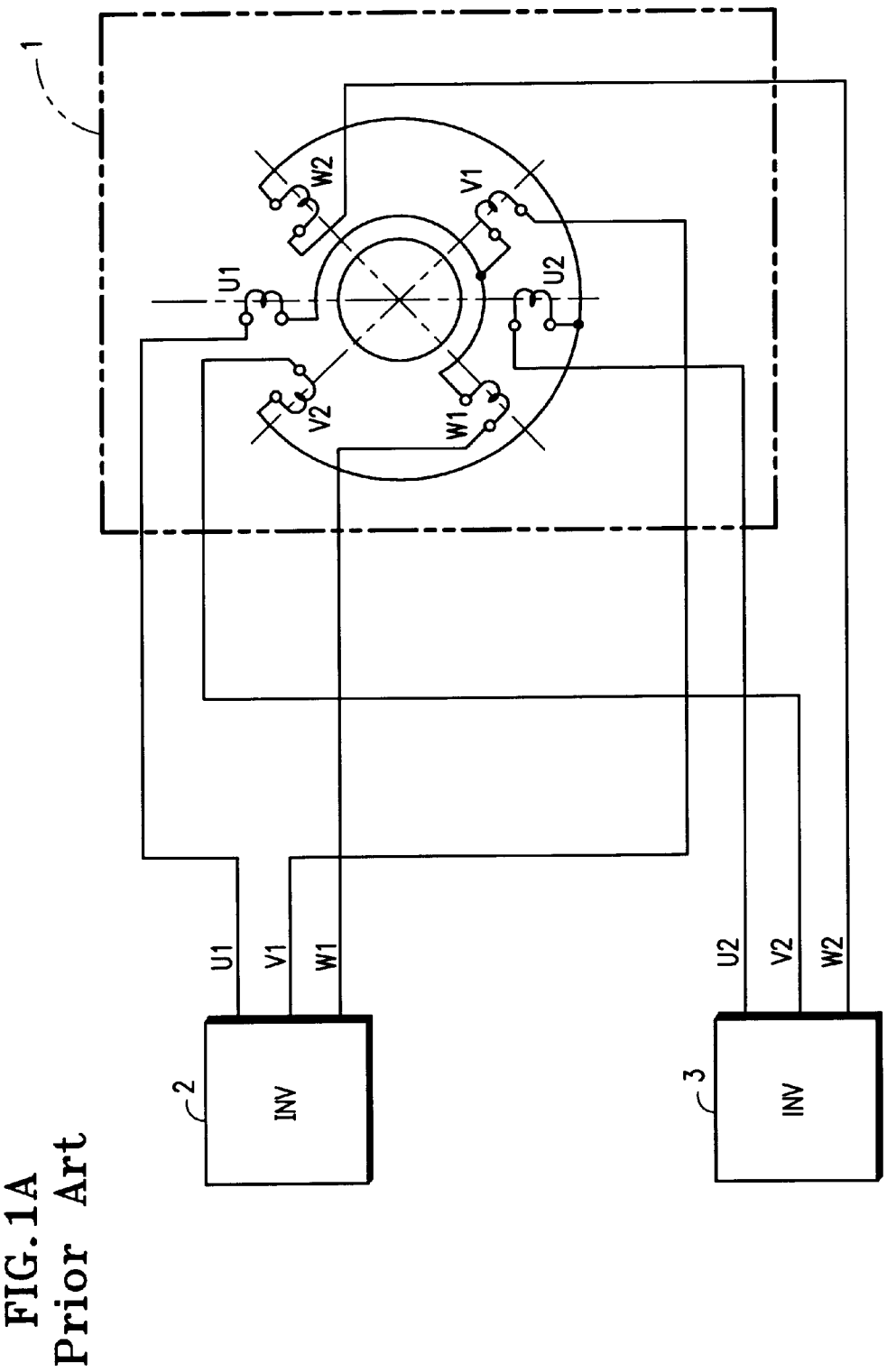
FIGS. 1A and 1B are schematic block diagrams of a double-wound, three-phase, variable speed motor driven by a pair of inverters, according to the prior art.
Figure 1B:
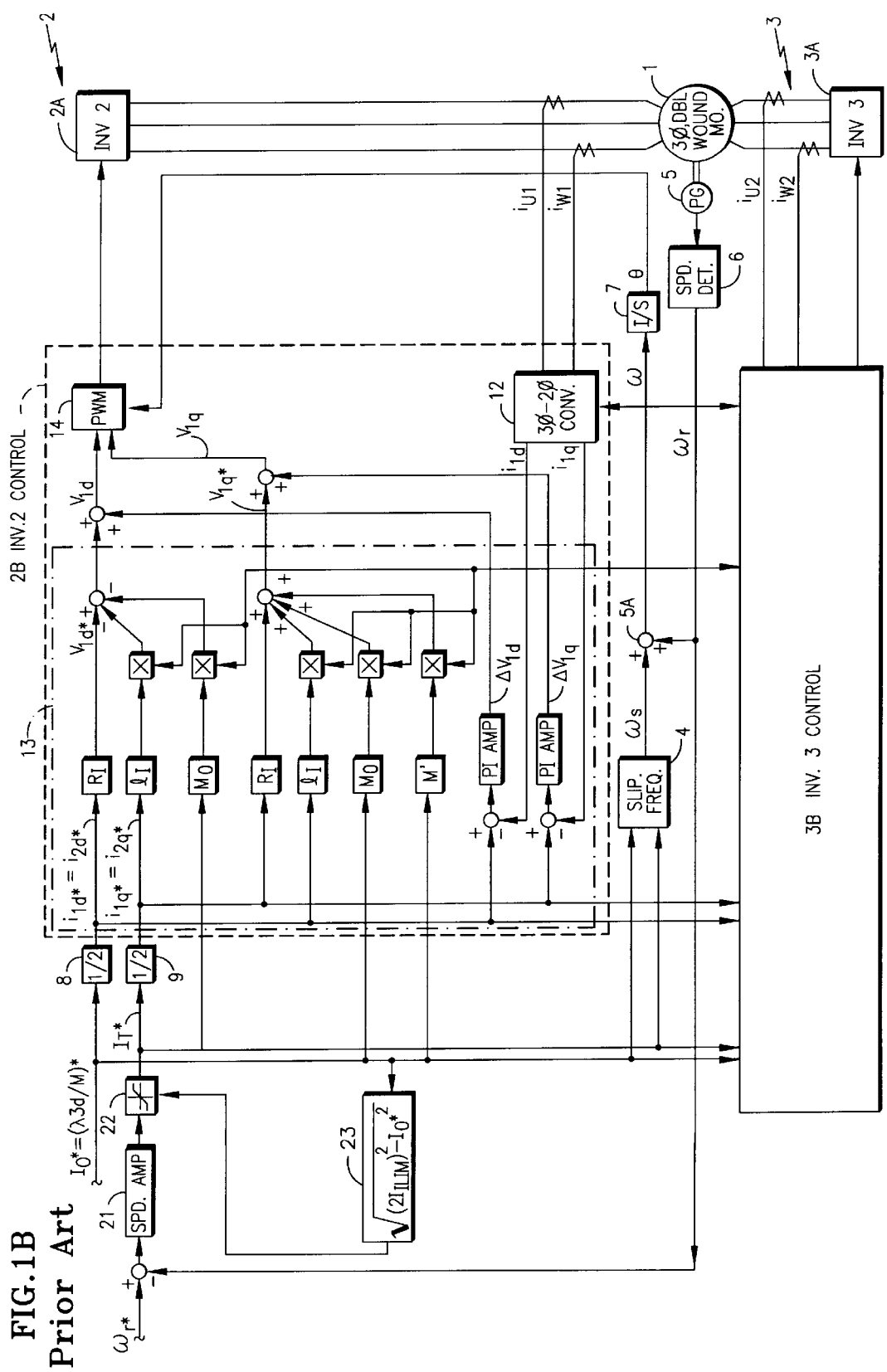

Referring to FIGS. 1A and 1B, a three-phase, double-wound variable speed motor 1 is driven by a pair of inverters 2, 3, each inverter driving a corresponding coil set in the motor 1. The inverter 2 includes inverter switches 2A and an inverter control 2B. Similarly, the inverter 3 includes inverter switches 3A and an inverter control 3B. A slip frequency generator 4 responds to an excitation current command $I_0^*$ and a torque current command $I_T^*$ to provide a slip frequency $\omega_s$ to an adder 5A, where the actual rotational frequency $\omega_r$ is added thereto to provide the frequency $\omega$ which is integrated in an integrator 7 to provide a phase angle $\Theta$, to various parts of the inverter controls 2B, 3B. The actual rotational frequency of the motor $\omega_r$ is provided from the signals of a pulse generator 5 which are converted to frequency in a speed detector 6, all of which is conventional. In order to drive the motor with two inverters, the excitation command $I_0^*$ and the torque command $I_T^*$ are each divided in half by corresponding dividers 8, 9. This provides in-phase current command components $i_{1q}^*$, $i_{2q}^*$ and $i_{1d}^*$, $i_{2d}^*$ for the two inverter controls 2B, 3B.

A proportional and integral amplifier 10 provides a torque voltage command $\Delta V_{1d}$ in response to the difference between one-half of the excitation current command $i_{1d}^*$ and the quadrature component $i_{1d}$ of the actual three-phase motor currents provided by inverter 2. A proportional and integral amplifier 11 provides a torque voltage command $\Delta V_{1q}$ in response to the difference between one-half of the torque current command, $I_{1q}^*$, and the in-phase component $i_{1q}$ of the actual three-phase motor currents. The in-phase and quadrature components are provided by a three-phase-to-two-phase converter 12. The voltage command components provided by the amplifiers 10, 11 are added to in-phase and quadrature voltage commands $V_{1q}^*$, $V_{1d}^*$ which are provided by a conventional voltage command generator 13, to provide in-phase and quadrature voltage components $V_{1q}$, $V_{1d}$ to a conventional pulse width modulation circuit 14, which in turn controls the switches within the inverter 2A.

Figures 3, 4:
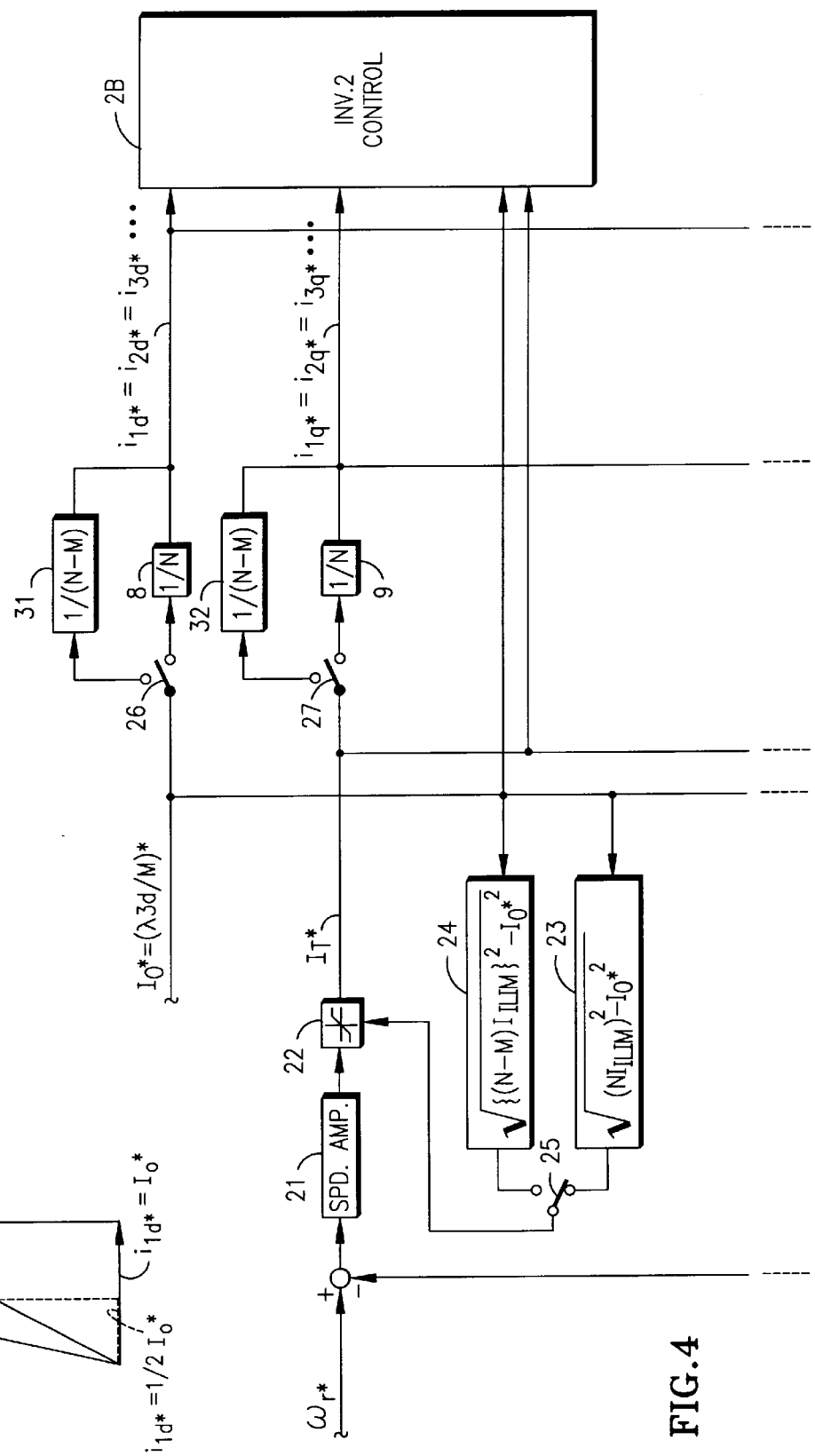
FIG. 3 is a vector diagram illustrating the relationship between torque current, excitation current, and limiting current.
FIG. 4 is a fragmentary schematic block diagram illustrating adaptation of the apparatus of FIG. 2 to handle more than two inverters with a multiple-wound motor.

A speed command $\omega_s^*$ has subtracted from it the actual speed of the rotor $\omega_r$ to provide a speed error signal applied to a speed amplifier 21. The output of the speed amplifier is applied to a limiter 22, the limit value of which is provided by an arithmetic function 23. Since two inverters are driving the motor, the current limit value can be twice the current limit for each inverter, $2I_{ILIM}$. The limiting of the torque current command $I_T^*$ is illustrated in FIG. 3.

The torque produced by a multiple-wound motor in response to multiple inverters is $$T = \frac{POLE}{2} \times M'(i_{1d} + i_{2d} + i_{3d}\ldots)(i_{1q} + i_{2q} + i_{3q}\ldots)$$

where POLE=the number of poles in the motor
and M=a conventional constant related to mutual inductances of the motor coils when one or more inverters fail, the torque is reduced by $(N-M)^2/N^2$, due to loss of both the d component and the q component. In a double wound motor, failure of one inverter reduces the torque to ¼ of the normal torque.

Figure 2:
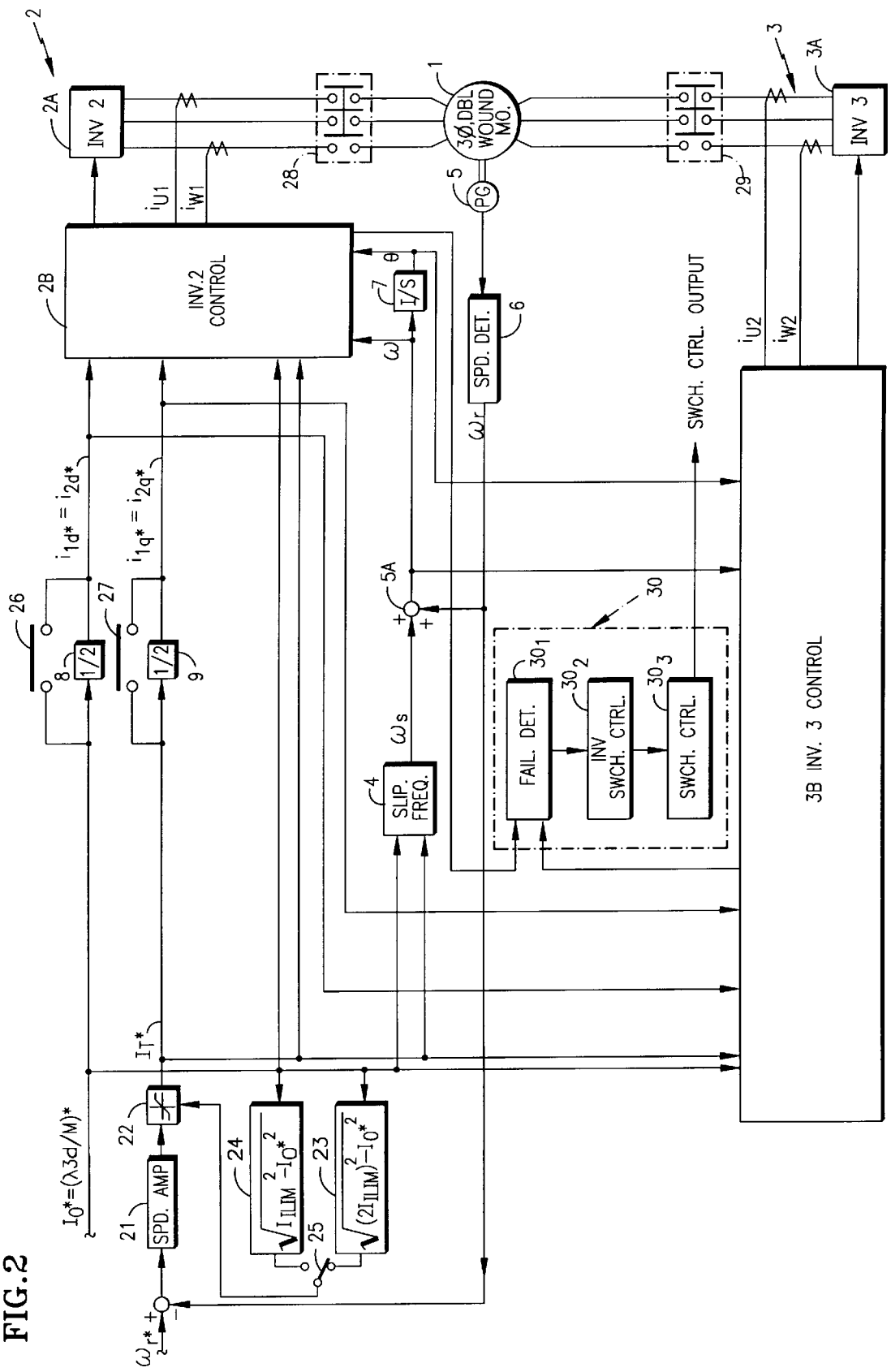
FIG. 2 is a schematic block diagram of a double-wound motor being driven by a pair of pulse width modulation inverters according to the present invention, including failure detecting circuitry, which illustrates aspects of the present invention.

A first aspect of the invention is illustrated in FIG. 2, in which a pair of switches 26, 27 short circuit the dividers so as to provide a full measure of current commands to the inverter control 2B upon failure of the inverter 3. The switches 26, 27 are operated by a switch control output from a failure control circuit 30 which includes a failure detector $30_1$, an inverter switch control, $30_2$, and a switch control $30_3$. The failure detector $30_1$ determines when there has been a failure in either of the inverters 2, 3, such as a fuse failure or damaging of the main circuit elements in the inverters. This provides the full excitation current command $I_0^*$ and torque current command, I to the inverter control 2B, so as drive the motor as robustly with one inverter as it would be driven with two. Additionally, the switch control output from the failure control circuits 30 causes a switch 25 to transfer the limit control from the arithmetic function 23 to an arithmetic function 24 so as to base the torque current limit on the maximum current limitation allowed in a single inverter, $I_{ILIM}$. The switch control output from the failure control circuits 30 also operates a selected one of a pair of motor switches 28, 29, so as to disconnect the motor 1 from the failed inverter (here assumed to be inverter 3).

Reference to FIG. 3 shows that the permissible torque current $I_T^*$ when there is a full excitation current $I_0^*$ is a little less than it would be when there is only ½ of the excitation current, ½ IO*.

The description of one aspect of the present invention with respect to FIG. 2 is illustrative of a special case of a double-wound motor being driven by two inverters. In the general case of an N-wound motor, shown in FIG. 4, this aspect of the invention can tolerate the failure of M inverters, by providing divider circuits 31, 32 in which the divisor is (N−M). Similarly, the limiting factor generated in the arithmetic function 24 is determined by the number of remaining inverters, N minus M. The values of (N−M) are provided by the inverter switch control circuits 30 in response to the number of inverters, M, which it has sensed have failed.

Figure 5:
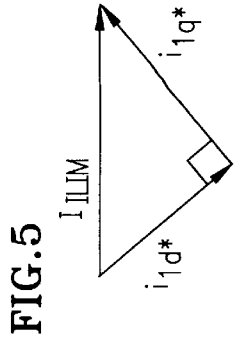
FIG. 5 is a vector diagram illustrating relationships between currents in a double-wound motor.
Figure 6:
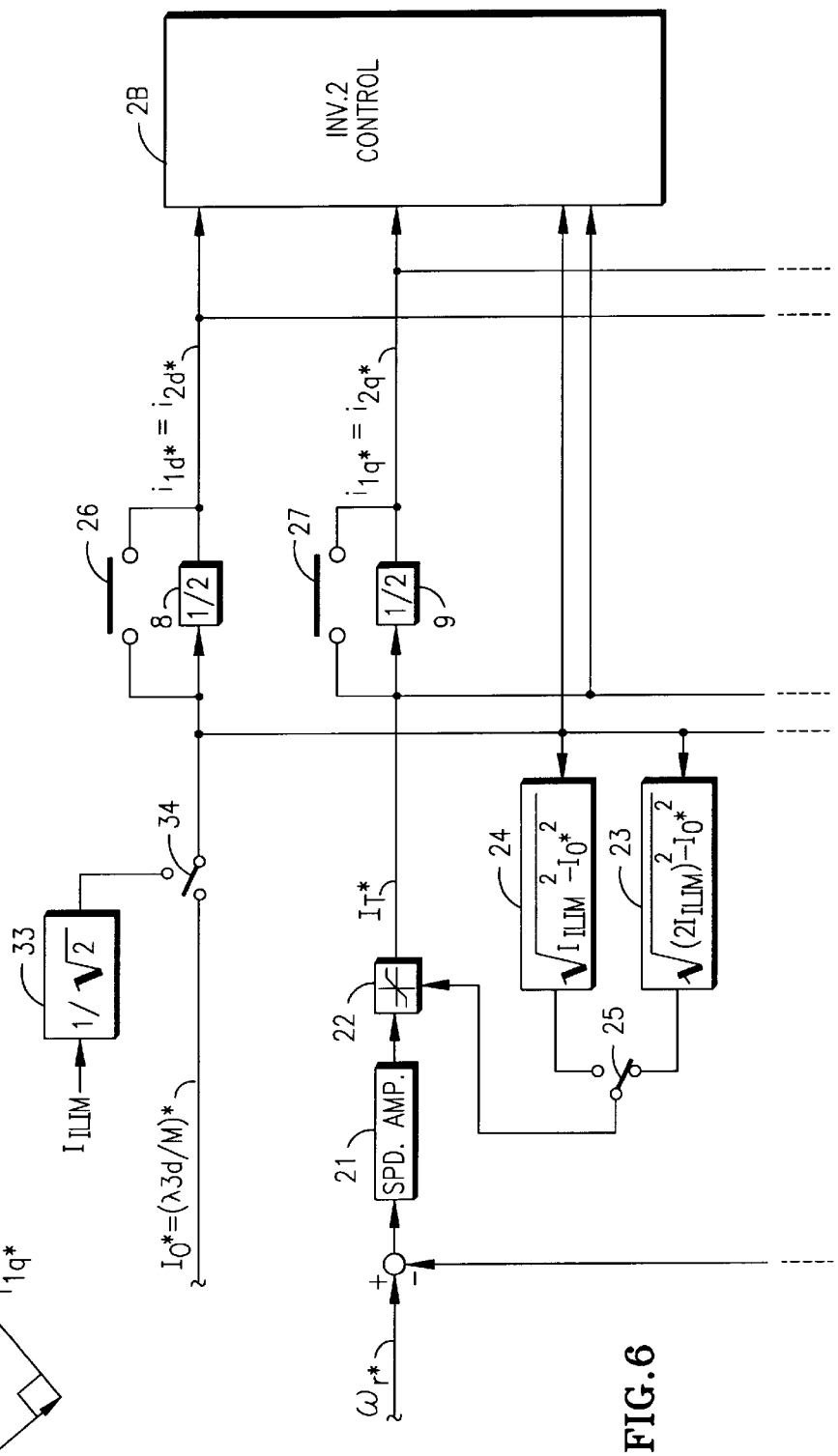
FIG. 6 is a partial schematic block diagram illustrating a second aspect of the present invention in a double-wound motor.

A second aspect of the present invention is illustrated in FIG. 5. Therein, the relationship between the in phase current command $i_{1q}$, the quadrature current command $i_{1d}$, and the limiting current for an inverter $I_{ILIM}$ shows that the in-phase current component, which is the equivalent of the torque current command, $I_T^*$, is equal to the limiting current over the square root of two, by simple arithmetic. Referring to FIG. 6, in order to operate the functioning inverter at the maximum current possible, that is, restricted only by the maximum inverter current, $I_{ILIM}$, when one of the inverters has failed, in addition to the switches 25–27 short circuiting the dividers 8, 9 and changing the torque current command limit value, a switch 34 transfers the input from the excitation current command $I_0^* = \lambda_{3d}/M$, to the output of a divider 33, the input of which is the limiting current $I_{ILIM}$ and the output of which is the limiting current divided by the square root of two. In FIG. 6, when $I_0^{*2}$ is equal to $(I_{ILIM}/\sqrt{2})^2$ due to switch 34 and divider 33, the limiting value in arithmetic function 24 reduces arithmetically to $I_{ILIM}/\sqrt{2}$. With $I_{1d}^* = I_{ILIM}/\sqrt{2}$ from divider 33, and maximum $I_{1q}^* = I_{ILIM}/\sqrt{2}$ from limiter 22, the maximum torque will be obtained from one inverter (2), after failures of the other inverter (3).

Figures 7, 8:
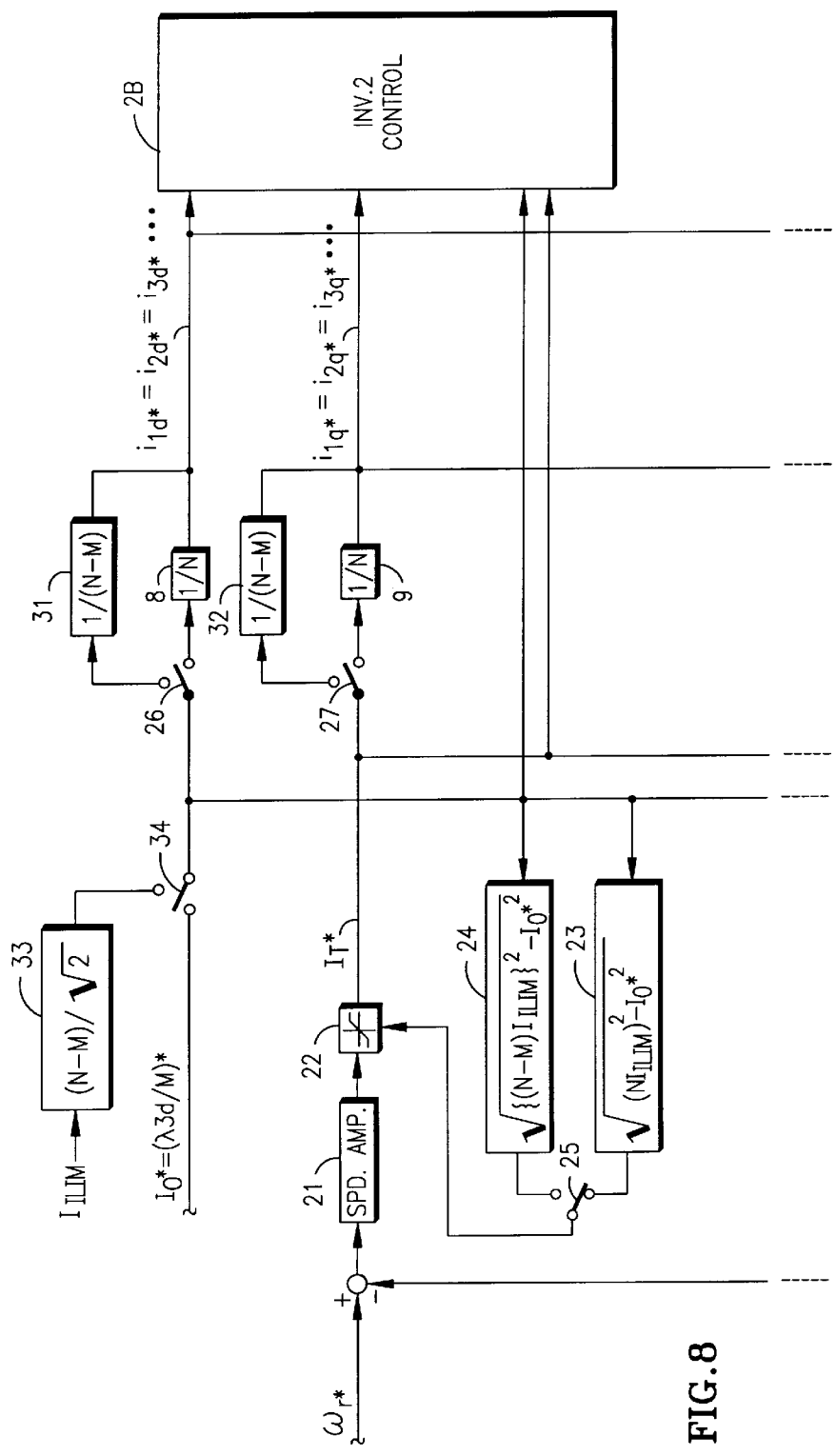
FIG. 7 is a vector diagram illustrating currents in a motor having three or more windings.
FIG. 8 is a partial schematic diagram illustrating the second aspect of the invention with a motor having more than two winding sets.

In all other respects, the embodiment of FIG. 6 is identical to the embodiment of FIG. 2. FIG. 7 illustrates the general case of this aspect of the invention in which there may be N−M functioning inverters, the limiting current will be that of N−M inverters. As shown in FIG. 8, therefore, the divider 33 provides the signal equivalent to $(N-M)I_{ILIM}$ divided by the square root of two. In all other respects, the embodiment of FIG. 8 is identical to the embodiment of FIG. 4.

In FIG. 1, the voltage command generator 13 provides outputs which have added thereto the values $\Delta V_{1q}$ and $\Delta V_{1d}$ provided by the amplifiers 10, 11. In the event that there is no current feedback from the converter 12, then the output of the amplifiers 10 and 11 will be significantly larger than such outputs would be with current feedback. This can have the effect of driving the pulse width modulation circuit 14 with higher voltage commands whenever the current feedback is turned off, in accordance with another aspect of the invention illustrated in FIG. 9 through FIG. 12.

Figure 9:
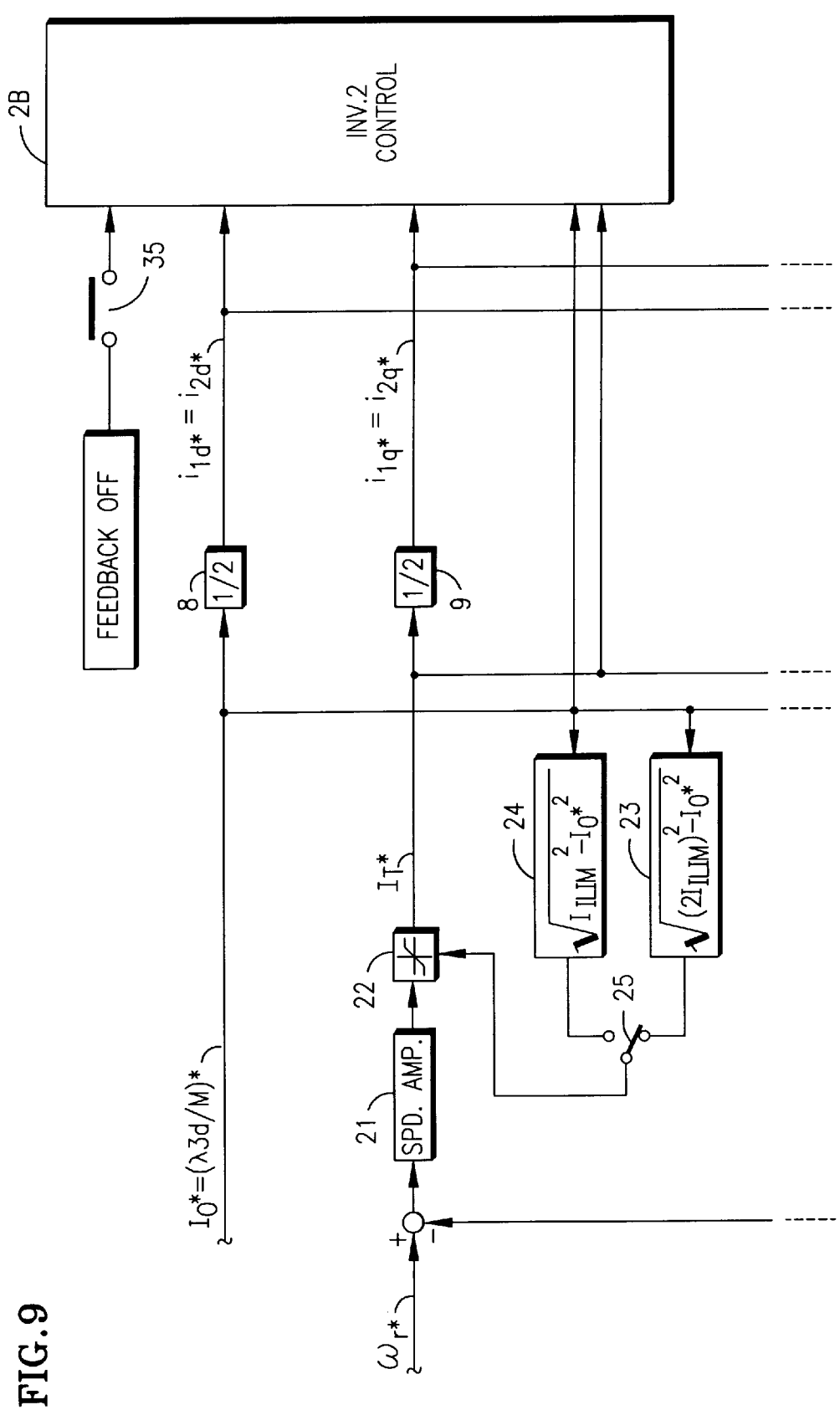
FIGS. 9–12 are partial schematic block diagrams illustrating various forms of a third aspect of the present invention.
Figure 10:
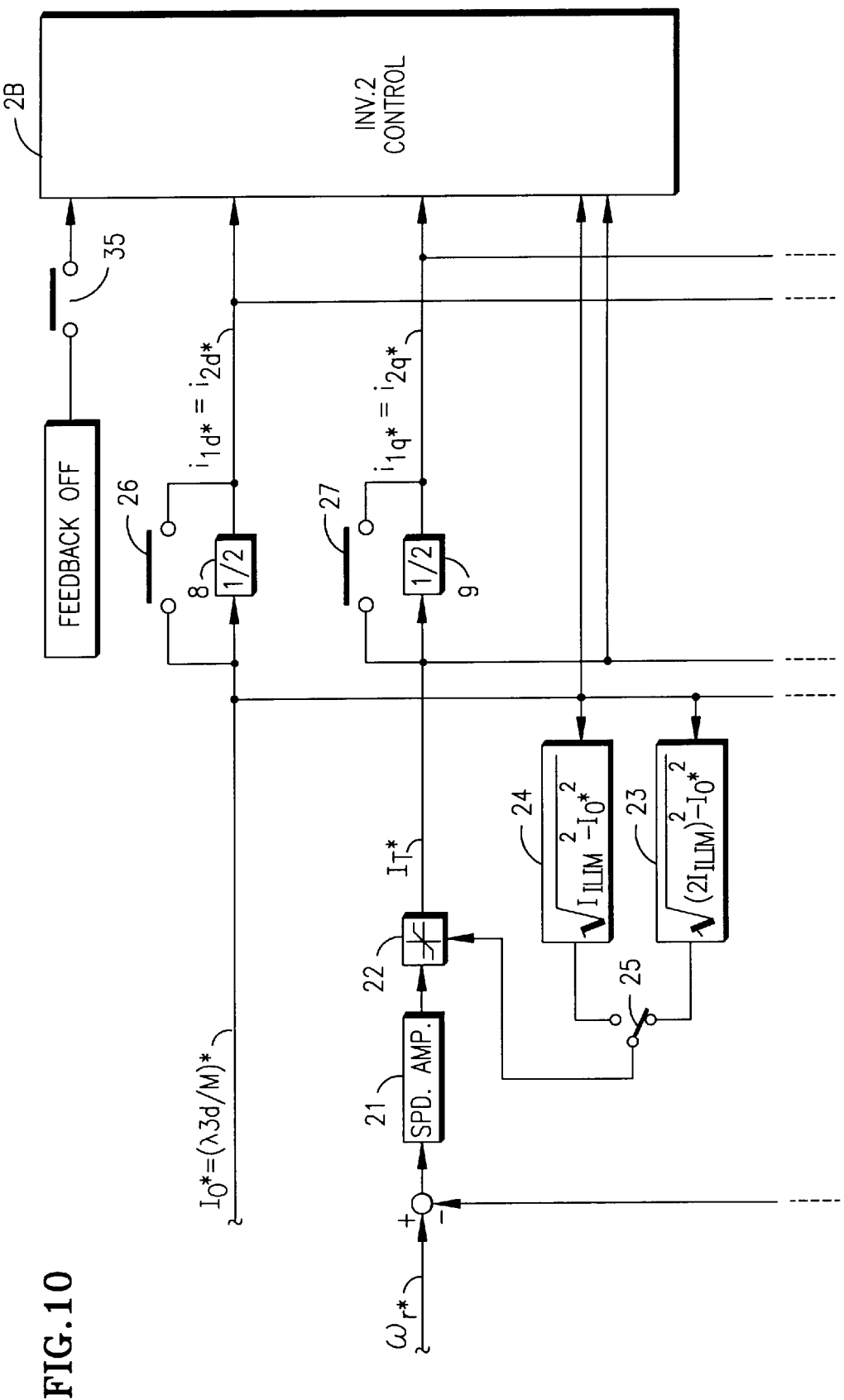
Figure 11:
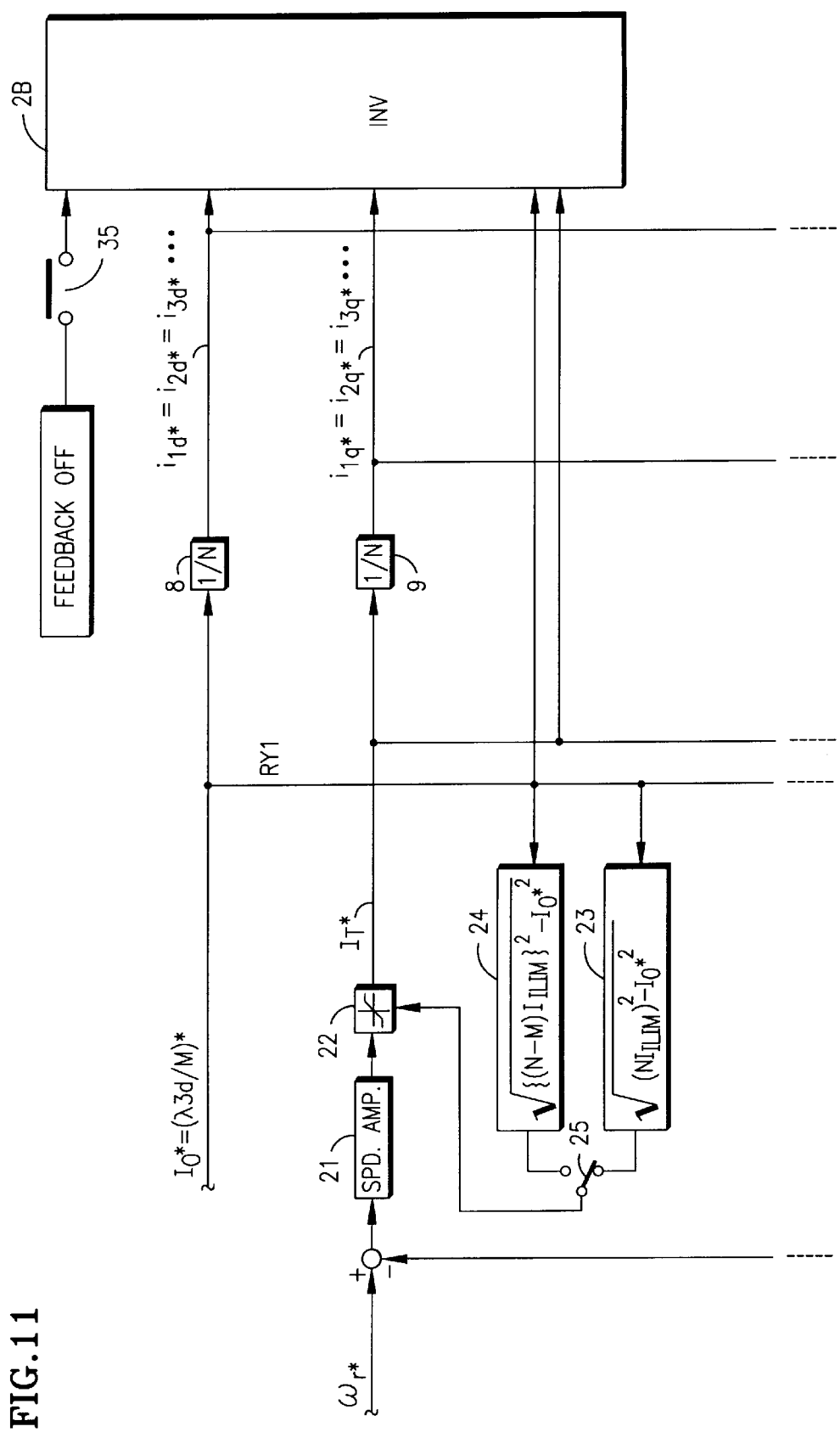
Figure 12:
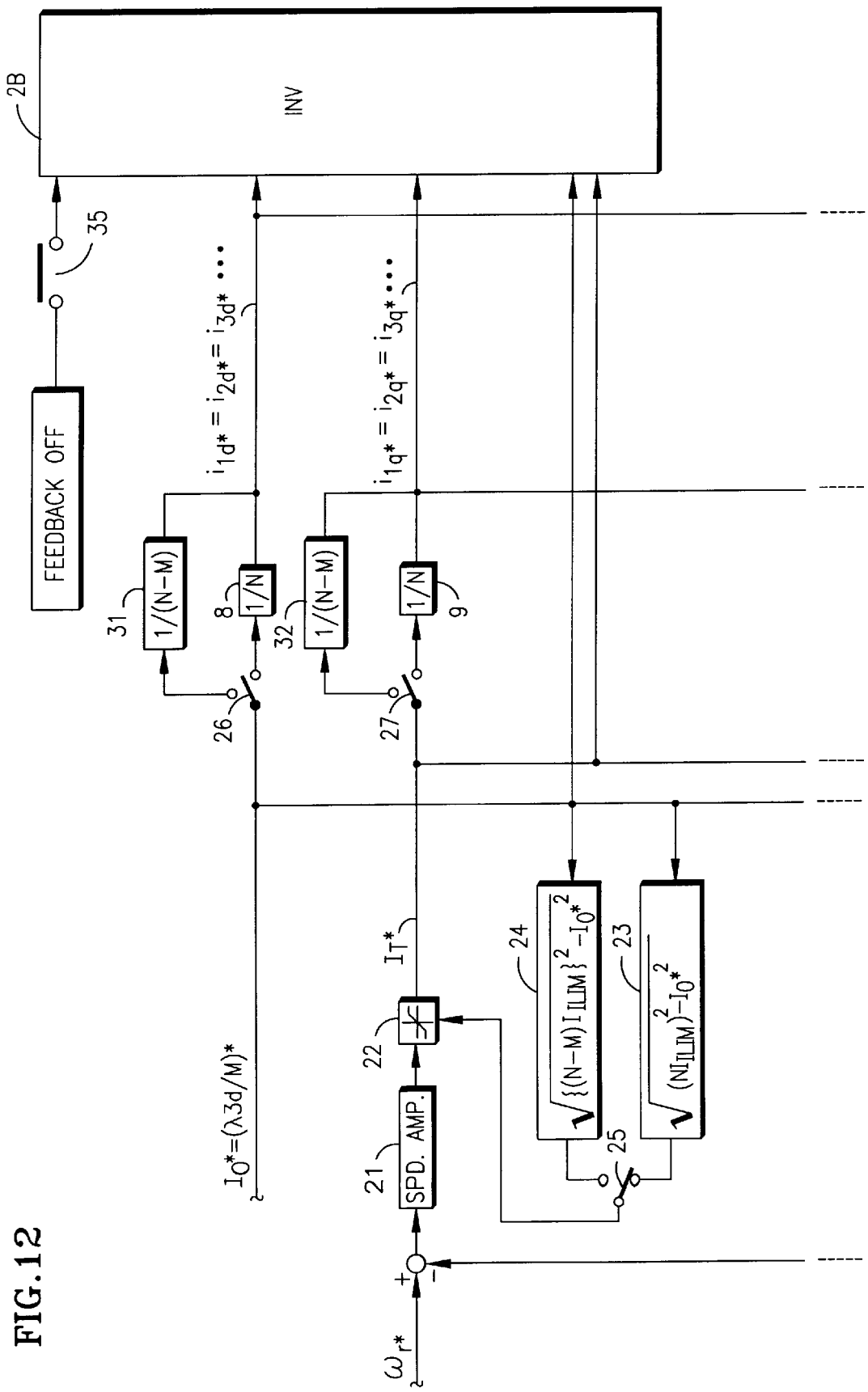

FIG. 9 is similar to FIG. 2 except that no switches are provided to short circuit the dividers 8,9. Instead, a switch 35 allows a "feedback off" command to turn off the current feedback within the inverter control 2B. Reference to FIG. 1 shows that if the current feedback is turned off, the summing junctions at the inputs to the amplifiers 10, 11 will have nothing subtracted, so that the outputs of the amplifiers 10, 11 will be much higher than they normally would be, the motor drive being governed only by the speed feedback to the speed amplifier 21. This causes driving of the pulse width modulation circuit 14 more robustly than normal, in order to compensate for having the failed inverter turned off. The switch 35 is operated by the output of the failure control circuits 30, along with operating the other switches. FIG. 10 illustrates that, in addition to the feedback being turned off by virtue of the switch 35, the dividers 8,9 can be short circuited by switches 26, 27, since it makes little difference whether the commands are divided in half or not once the feedback current has been turned off. FIG. 11 and FIG. 12 illustrate that this third aspect of the present invention can be practiced, with or without short circuiting dividers 31, 32, in the general case where more than two winding sets are used on the motor, driven by more than two corresponding inverters.

Figure 13:
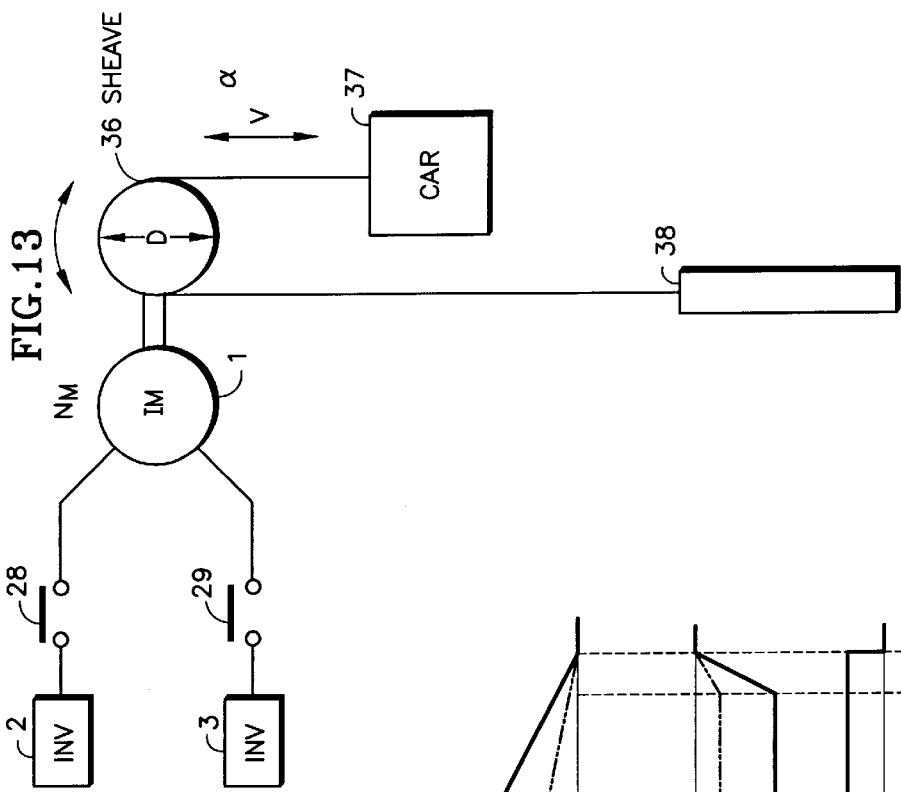
FIG. 13 is a simplified schematic diagram of an elevator system employing the invention.

In FIG. 13, a three-phase, N-wound induction motor 1 is driving a sheave 36 which is roped to an elevator car 37 and a counterweight 38. The car 37 moves with a velocity, V, illustrated in FIG. 14, and an acceleration, α. Therein, the solid line depicts a full speed run and the dot-dash line illustrates a reduced speed run. It can be seen that the load torque $T_{MR}$ (supporting the load against the force of gravity) is constant at all speeds and rates of change of speed, and is the same whether a reduced speed profile is used or not.

Figure 14:
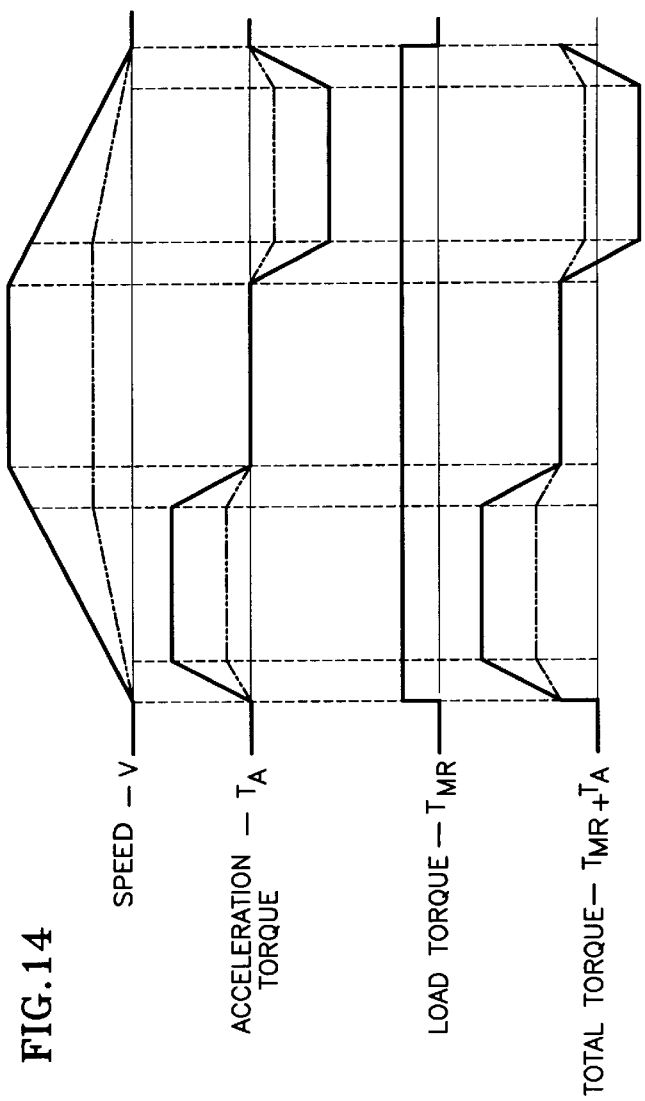
FIG. 14 is a chart of speed and torque relationships in accordance with a fourth aspect of the present invention.

In FIG. 14, in order to achieve a speed V, illustrated at the top of FIG. 14, an acceleration torque, $T_A$, shown in the second illustration of FIG. 14, is required. The load torque, $T_{MR}$, is constant, resulting in total torque $T_{MR}+T_A$ as illustrated in the lowest portion of FIG. 14.

In FIG. 13, the power required $P_R$ (in kilowatts) to run the elevator is:

$$P_R = \frac{F \times V}{6120\eta}$$

where: F=force, in kilograms

V=velocity of car and counterweight, in meters per minute and η=overall elevator drive efficiency The force in an elevator is the fraction, $K_U$, of rated load, $W_R$, which the current loading of the car equals. Therefore, $$P_R = \frac{K_u \times W_R \times V_R}{6120\eta}$$

where $V_R$=rated car velocity

The motor torque, T (in kilogram-meters) is $$T = \frac{P \times 1000}{1.027 \times N_M}$$

where: $N_M$=motor angular velocity, in rpm

The torque during acceleration, $T_A$, is $$T_A = (GD^2 \times N_M)/(375 t_a)$$

where: $GD^2$=motor shaft conversion, in kilogram-meters squared and $t_a$=time utilized to accelerate to a constant speed The car speed, v (meters per second) relates to the motor angular velocity $N_m$ as follows:

$$v = 2\pi \frac{D}{2} \frac{N_m}{60} = \frac{\pi D N_m}{60}$$

By substituting the motor angular velocity $$N_m = \frac{60}{\pi D} \times v \text{ into}$$

the torque equation, the torque required for acceleration is:

$$T_A = (60 \; GD^2 / 375\pi D) v / t_a$$
$$= (60 \; GD^2 / 375\pi D) \alpha$$

where α is the average acceleration of the elevator car.

Referring to FIG. 2, when one of two inverters has failed, the torque current command is limited by the limiter 22 and the limit function 24:

$$I_T^* = (I_{ILIM}^2 - I_0^{*2})^{1/2}$$

and maximum torque will be $$T_{MAX} = T_{MR} + T_A = \frac{POLE}{2} M' I_0^* \{[(N-M)I_{ILIM}]^2 - I_0^{*2}\}^{\frac{1}{2}}$$

$$TA = \frac{POLE}{2} M' I_0^* \{[(N-M)I_{ILIM}]^2 - I_0^{*2}\}^{\frac{1}{2}} - T_{MR}$$

so the acceleration must be limited to $$\alpha = 375\pi D/60 GD^2 \{(POLE/2) \; M'I_0^* \{[(N-M)I_{ILIM}]^2 - I_0^{*2}\}^{1/2} - T_{MR}\}$$

in order to keep the total torque, $T_{MAX}$, within that allowed by the limit on $I_T^*$, above. In a double wound motor, N−M becomes unity (N−M=1).

This fourth aspect of the invention may also be used in combination with the second aspect of the invention, as described hereinbefore with respect to FIGS. 5–7. In such a case, the acceleration in a double-wound motor must be limited, after failure of one inverter, to:

$$\alpha = 375\pi D/60 GD^2 \{(POLE/2) M'(I_{ILIM}/\sqrt{2})[I_{ILIM}^2 - (I_{ILIM}/\sqrt{2})^2]^{1/2} - T_{MR}\}$$

$$\alpha = 375\pi D/60 GD^2 \{(POLE/2) M'(I_{ILIM}/\sqrt{2})[I_{ILIM}^2 - (I_{ILIM}^2/2)]^{1/2} - T_{MR}\}$$

$$\alpha = 375\pi D/60 GD^2 \{(POLE/2) M'(I_{ILIM}/\sqrt{2})(I_{ILIM}/\sqrt{2}) - T_{MR}\}$$

$$\alpha=375\pi D/60GD^2\{(POLE/2)M'I_{ILIM}^2/2-T_{MR}\}$$

A similar relationship can be provided for the general case of an N-wound motor with M failed inverters:

$$\alpha=375\pi D/60GD^2\{(POLE/2)M'[(N-M)I_{ILIM}^2]/2-T_{MR}\}$$

With acceleration limited by the maximum torque of N−M functioning inverters, the speed will not reach rated speed, but will be as shown by the dot-dash line in FIG. 14. To achieve such a speed profile, the speed command, $\omega_r{}^*$ must be determined by integrating the pattern of acceleration, given above; in the simple case of FIG. 14, the speed command is reduced to $\omega_r=\alpha t_A$.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. An elevator motor drive system, comprising:
   a multiple-wound, three-phase, variable speed motor having a plurality, N, of winding sets;
   a car and a counterweight roped to a sheave driven by said motor;
   a plurality, N, of pulse width modulation inverters, each for providing current to a corresponding one of said winding sets;
   an actual speed detector responsive to the angular motion of said motor to provide an actual speed signal;
   a speed controller receiving an angular speed command signal and providing a torque current command signal as a limited function of the difference between said angular speed command signal and said actual speed signal;
   means providing an excitation current command signal;
   a first arithmetic function for providing a torque current command limit equal to the square root of the difference between the square of the summation of maximum current which can be tolerated by all of said inverters collectively and the square of said excitation current command;
   characterized by the improvement comprising:
      a failure control for providing switch control output signals in response to a failure in any of said inverters and for disconnecting from said motor any inverter sensed to have failed;
      a second arithmetic function for providing a torque current command limit equal to the square root of the difference between the square of the summation of maximum current which may collectively be tolerated by those of said inverters which have not failed collectively and the square of said excitation current command; and
      a switch responsive to said failure control to cause said current control to limit said torque current command signal in response to said first arithmetic function when no inverter has failed and to cause said current control to limit said torque current command signal in response to said second arithmetic function in response to said switch control output signals.

2. A system according to claim 1 further characterized by each of said inverters further comprising:
   a first voltage command component amplifier for providing an in-phase voltage command component in response to the difference between said torque current command and an in-phase component of actual motor feedback current; and
   a second voltage command component amplifier for providing a quadrature voltage command component in response to the difference between said excitation current command and a quadrature component of actual motor feedback current; and wherein said switch control output signals disengage said in-phase and quadrature components of actual motor feedback current from said first and second amplifiers.

3. A system according to claim 1, further comprising:
   a first divider for dividing said excitation current command signal by N;
   a second divider for dividing said limited torque command signal by N;
   a third divider for dividing said excitation current command signal by N−M, where M is the number of inverters which said failure control has sensed to have failed;
   a fourth divider for dividing said limited torque command signal by N−M;
   and switches responsive to said failure control for applying current commands from said first and second dividers to said N inverters when no inverter has failed, and for applying current commands from said third and fourth inverters to those of said inverters which have not failed in response to said switch control output signals.

4. A system according to claim 3 further characterized by each of said inverters further comprising: a first voltage command component amplifier for providing an in-phase voltage command component in response to the difference between said torque current command and an in-phase component of actual motor feedback current; and
   a second voltage command component amplifier for providing a quadrature voltage command component in response to the difference between said excitation current command and a quadrature component of actual motor feedback current; and wherein
   said switch control output disengages said in-phase and quadrature components of actual motor feedback current from said first and second amplifiers.

5. A system according to claim 1, further comprising:
   means for providing said excitation current command signal as a function of the motor secondary magnetic flux and mutual inductance when no inverter has failed and for providing, in response to said switch control output signal, said excitation current command signal as the aggregate maximum current which can be tolerated by those of said inverters which have not failed, divided by the square root of two.

6. A system according to any of claims 1–5 further comprising means operative in response to said switch control output signals for providing said angular speed command signal as the integration over an acceleration interval of an acceleration limited by the maximum torque available from those of said inverters which have not failed as a function of the aggregate maximum current which can be tolerated by those of said inverters which have not failed, less the torque required to support the load represented by said car and said counterweight.

* * * * *